(12) United States Patent
Montinaro et al.

(10) Patent No.: US 10,707,496 B2
(45) Date of Patent: Jul. 7, 2020

(54) METHOD FOR DEPOSITING LAYER OF CERAMIC MATERIAL ONTO A METALLIC SUPPORT FOR SOLID OXIDE FUEL CELLS

(71) Applicant: SOFCPOWER S.p.A., Mezzolombardo (Trento) (IT)

(72) Inventors: Dario Montinaro, Trento (IT); Massimo Bertoldi, Trento (IT); Vincenzo Maria Sglavo, Roncegno Terme (IT); Pradnyesh Satardekar, Goa (IN)

(73) Assignee: SOFCPOWER S.P.A., Mezzolombardo (Trento) (IT)

(*) Notice: Subject to any disclaimer, the term of this patent is extended or adjusted under 35 U.S.C. 154(b) by 61 days.

(21) Appl. No.: 14/911,637

(22) PCT Filed: Aug. 13, 2014

(86) PCT No.: PCT/IB2014/063901
§ 371 (c)(1),
(2) Date: Feb. 11, 2016

(87) PCT Pub. No.: WO2015/022655
PCT Pub. Date: Feb. 19, 2015

(65) Prior Publication Data
US 2016/0197356 A1    Jul. 7, 2016

(30) Foreign Application Priority Data

Aug. 13, 2013   (IT) .............................. VR2013A0200

(51) Int. Cl.
*H01M 4/88* (2006.01)
*C25D 9/08* (2006.01)
(Continued)

(52) U.S. Cl.
CPC ............ *H01M 4/8853* (2013.01); *C25D 9/08* (2013.01); *C25D 21/12* (2013.01); *H01M 8/1226* (2013.01); *H01M 2004/8684* (2013.01)

(58) Field of Classification Search
CPC .... H01M 8/1226; H01M 4/8853; C25D 9/08; C25D 21/12
(Continued)

(56) References Cited

U.S. PATENT DOCUMENTS

2004/0026260 A1   2/2004   Stoffer et al.
2005/0048357 A1   3/2005   Badding et al.
(Continued)

FOREIGN PATENT DOCUMENTS

EP        1850412       10/2007
WO      2008063843       5/2008

OTHER PUBLICATIONS

Zhitomirsky et al., Electrochemical deposition of ceria and doped ceria films, 2001, Ceramic International, 27, 149-155 (Year: 2011).*
(Continued)

*Primary Examiner* — Sean P Cullen
(74) *Attorney, Agent, or Firm* — Tutunjian & Bitetto, P.C.

(57) ABSTRACT

A method for depositing a layer of material on a metallic support for fuel cells or electrolysis cells includes the steps of preparing the surface of the metallic support, preparing an apparatus for an electrolytic bath, with the relative actuation means of the apparatus, including an aqueous solution with the cations necessary to obtain at least one material, dipping the metallic support into the electrolytic bath, and commanding the actuation means of the electrolytic bath so as to selectively carry out the electrochemical deposition of at least one layer of material on the metallic support, the layer of material includes an anti-corrosion protective ceramic material and/or a ceramic material with catalytic properties.

9 Claims, 2 Drawing Sheets

(51) Int. Cl.
   *H01M 8/1226* (2016.01)
   *C25D 21/12* (2006.01)
   *H01M 4/86* (2006.01)

(58) Field of Classification Search
   USPC .......................................... 429/522; 205/205
   See application file for complete search history.

(56) References Cited

U.S. PATENT DOCUMENTS

| | | | |
|---|---|---|---|
| 2005/0271931 A1* | 12/2005 | Finnerty | H01M 4/8621 |
| | | | 429/486 |
| 2007/0237998 A1* | 10/2007 | Armstrong | H01M 8/04089 |
| | | | 429/489 |
| 2007/0269701 A1* | 11/2007 | Larsen | H01M 4/8621 |
| | | | 429/489 |
| 2009/0061279 A1* | 3/2009 | Larsen | H01M 4/9033 |
| | | | 429/410 |
| 2010/0167084 A1* | 7/2010 | Bhattacharya | C25D 5/08 |
| | | | 428/637 |
| 2012/0121999 A1* | 5/2012 | Laurencin | H01M 4/861 |
| | | | 429/423 |
| 2012/0128934 A1 | 5/2012 | Pedraza Diaz et al. | |

OTHER PUBLICATIONS

Boccaccini et al., Application of electrophoretic and electrolytic deposition techniques in ceramics processing, 2002, Current Opion in Solid State and Materials Science, 6, 251-260 (Year: 2002).*
Bozzini, Benedetto, Electrodeposition of a Au-Dy2O3 Composite Solid Oxide Fuel Cell Catalyst from Eutectic Urea/Choline Chloride Ionic Liquid, Energies 2012, 5, 5363-5371, Dec. 19, 2012.

* cited by examiner

METHOD FOR DEPOSITING LAYER OF CERAMIC MATERIAL ONTO A METALLIC SUPPORT FOR SOLID OXIDE FUEL CELLS

TECHNICAL FIELD OF THE INVENTION

The present invention refers to a method for depositing a layer of material onto a metallic support for fuel cells or electrolysis cells, and the metallic support obtained by such a method.

According to a version of the present invention such a layer of material is a protective material, in particular a ceramic protective material; according to another version of the present invention such a layer of material is a ceramic catalytic material.

STATE OF THE ART

As known, fuel cells or electrolysis cells are electrochemical devices that directly convert the chemical energy of an oxidation reaction into electrical energy.

The typical structure of a fuel cell comprises two porous electrodes, anode and cathode, separated by a membrane, or electrolyte, which allows ion transportation.

There are different types of fuel cells, which essentially differ by the type of membrane and, consequently, by the operating temperature.

In particular, solid oxide fuel cells (SOFC) comprise a conductive ceramic membrane of oxygen ions; the typical operating temperatures of this type of cells vary between 600° C. and 900° C.

Solid oxide cells are typically employed in manufacturing fuel stacks for co-generating electrical and thermal energy, for both mobile and stationary applications, and for producing fuel gases through electrolysis.

In the state of the art, the anode consists of a mixture of nickel oxide and yttria-stabilized zirconia ("YSZ"); the electrolyte consists of yttria-stabilized zirconia ("YSZ"); the cathode, on the other hand, generally consists of mixed oxides with perovskite type structure, for example the most common ones are indicated with the acronym "LSCF" and "LSM".

Solid oxide cells can have either a planar or tubular configuration.

Moreover, according to the element of the cell that ensures the mechanical support, there are different types of cells.

Indeed, there are cells supported by the electrolyte, or cells supported by the electrode (anode or cathode), and also cells with a metallic support.

According to this last architecture, which is of particular interest for the purposes of the present invention, the cell comprises a porous, or dense, metallic support of complex 3D geometry, on which various relatively thin ceramic layers are applied, each element of the cell consisting of a different material.

The advantages in use of this type of cell are several, among which low costs, greater mechanical strength and greater resistance to oxidation/reduction cycles can be mentioned.

These cells can also differ from one another in relation to whether the anode, or the cathode, is in contact with the metallic support.

The cells are normally produced from powder form raw materials.

The powders, ceramic and/or metallic, are deposited according to the configuration that is wished to be given to the cell, and then they are sintered at high temperature—typically between 1000° C. and 1400° C.—to obtain a compact product.

The sintering of completely ceramic cells can foresee different sintering stages in air.

On the other hand, as far as cells supported by metal are concerned, already during the production phase, in order to avoid the oxidation of the metal it is necessary to sinter the materials in reducing or protective atmosphere, and therefore in the absence of air.

Due to the high operating temperatures of this type of cells, the metallic elements of which they consist—typically the metallic support—are subject to oxidation and corrosion phenomena.

In particular, the oxidation phenomenon is most critical at the interface between the metallic support and the catalytic layers.

It should also be observed that the so-called stack is normally made up of a certain number of cells arranged in series, that are connected to one another through metallic interconnections that are flat or even have complex geometry.

The high operating temperatures also cause the oxidation of these components, with reduction of electrical conductivity; moreover, there is a release of volatile elements that damage the catalytic properties of the cells.

The high temperature oxidation of the interconnectors can be generally limited through the application, on the metal, of a protective ceramic coating.

Such a coating is typically made up of manganese and cobalt oxides.

The coating protects the metal from the oxidizing atmosphere, whilst still maintaining good electrical conductivity.

The application of this coating on an interconnector with a simple geometry can be carried out through conventional technologies, for example silk-screen printing, dip coating, that is a coating by immersion, and others.

In this case, the single metallic component can be handled relatively easily according to the most appropriate temperature conditions and atmosphere set by the process.

Various technologies and/or strategies for manufacturing cells with metallic support are known: they are briefly quoted below.

A first technology foresees the pre-sintering of the substrate, and the subsequent deposition, even in several steps, of the electrodes and of the electrolyte.

Another technology foresees the manufacturing of a bilayer, consisting of porous support and electrolyte; the electrode between the support and the electrolyte is made by impregnating the support itself with a solution of salts that decomposes at high temperature, forming oxides.

According to another technology, the ceramic layers are deposited on the already sintered porous support with techniques such as vacuum plasma spray coatings, i.e. coatings obtained by plasma spraying vacuum, pulsed laser deposition (PLD) and the like, which make it possible to obtain a dense electrolyte without the need for a further sintering step.

According to yet another technology, the ceramic layers are applied onto the already sintered porous metallic substrate with vacuum techniques, for example physical vapour deposition (PVD), chemical vapour deposition (CVD) or the like.

A further technology foresees the co-sintering of a multilayer: the layers are all sintered at a high temperature in a single production step, and this makes it particularly interesting.

This technology, therefore, which is advantageous due to its simplicity and cost effective production, does however have some difficulties of application, linked mainly to the sintering, in the same stage, of electrode and metal.

Indeed, it is known that the metal must not pollute the electrode.

With the metal directly in contact with the anode, at a high temperature there could indeed be a diffusion of the chrome and iron in the anode and diffusion of nickel in the metal.

The possible consequences are a reduction in the catalytic activity of the anode and a change in the expansion coefficient of the metal.

In order to avoid such diffusion it is thus necessary to foresee a barrier layer between metal and anode, usually consisting of cerium-based oxides, cerium being inert and having a reasonable electrical conductivity.

However, such a barrier, if made with excessive thickness, could result in an excessive increase in electrical resistance, with a consequent worsening of the performance of the cell.

Moreover, even if the anode, in operating conditions, is fed with a reducing gas, the water produced by the oxidation reaction increases the partial pressure of the oxygen on the fuel side, significantly increasing the phenomenon of corrosion of the metallic support.

Obviously, this phenomenon is much more accentuated in electrolysis mode, when the electrode is fed with a high vapour content.

The attached FIG. 1, for better understanding, illustrates the single repetitive element 101 of a fuel stack according to the state of the art.

In particular, FIG. 1 illustrates a single element 101 of the metallic support type, which as stated is of particular interest in the present invention.

Normally, such an element 101 comprises a porous metallic support 102 to which a protective barrier 103 against the interdiffusion of elements, an anode 104, an electrolyte 105 and a cathode 106 of the types described earlier, are associated, in succession.

The mentioned elements 102-106 are arranged between two metallic interconnectors 107, which can also have complex geometry.

The interface between the cathode 106 and the respective interconnector 107 associated with it is ensured by a contact layer 108.

There are also lateral gaskets 109 that take care of keeping the fuel and the external environment separated.

The fuel stack thus comprises a sequence of single repetitive elements 101 of the type described.

As far as the interconnectors are concerned, and in the case in which they are dense interconnector, the relatively simple geometry makes it possible to protect the metal from oxidation by applying suitable ceramic coatings with conventional methods.

On the other hand, in the case of porous metallic supports, it is particularly difficult to apply a homogeneous coating in the mass of the support itself.

If it is assumed to apply the protective ceramic coating before the sintering process at high temperature, the coating itself would prevent the sintering of the powders or of the metallic presenter, limiting the volumetric shrinkage that is essential for obtaining a dense electrolyte.

For this last reason, the anti-corrosion coating must necessarily be applied onto the porous metallic support after the ceramic layers have been coupled with it and after the densification of the electrolyte.

The presence of ceramic layers supported on the metal, moreover, requires that the deposition technique be particularly selective and that it therefore preferentially covers the surface of the metal.

Impregnation techniques—by infiltration of a saline solution—to obtain a deposition of the anti-corrosion coating in all of the surfaces wetted by the solution are known and applicable.

However, such techniques are operatively too slow, since they can be carried out in various successive depositions; moreover, they only deposit the ceramic phase exclusively in the pores of the support, without selectively sticking to its surface.

SUMMARY OF THE INVENTION

The technical task of the present invention is therefore to improve the state of the art.

In such a technical task, a purpose of the present invention is to provide a method for depositing a layer of material onto a metallic support for fuel cells that makes it possible to apply an anti-corrosion protective layer on a metallic support already joint to an electrolyte and/or an electrode made from ceramic material.

Yet another purpose of the present invention is to provide a method that makes it possible to apply a layer of anti-corrosion protective ceramic material also on metallic supports of complex geometry, like for example the metallic interconnectors of the fuel cells.

This task and these purposes are achieved by the method for depositing a layer of material onto a metallic support for fuel cells according to the present principles.

The method according to the present invention comprises the steps of preparing the surface of the support, preparing an apparatus for an electrolytic bath, with the relative actuation means, containing an aqueous solution with the cations necessary for making at least one layer of ceramic material, dipping the support in the electrolytic bath, and commanding said actuation means of the electrolytic bath so as to selectively carry out the electrochemical deposition of at least one layer of material on the metallic support.

The present specification refers to preferred and advantageous embodiments of the invention.

BRIEF DESCRIPTION OF THE DRAWINGS

The characteristics of the invention shall become clearer to any man skilled in the art from the following description and from the attached tables of drawings, given as a non-limiting example, in which.

DETAILED DESCRIPTION OF THE INVENTION

Figure 1:
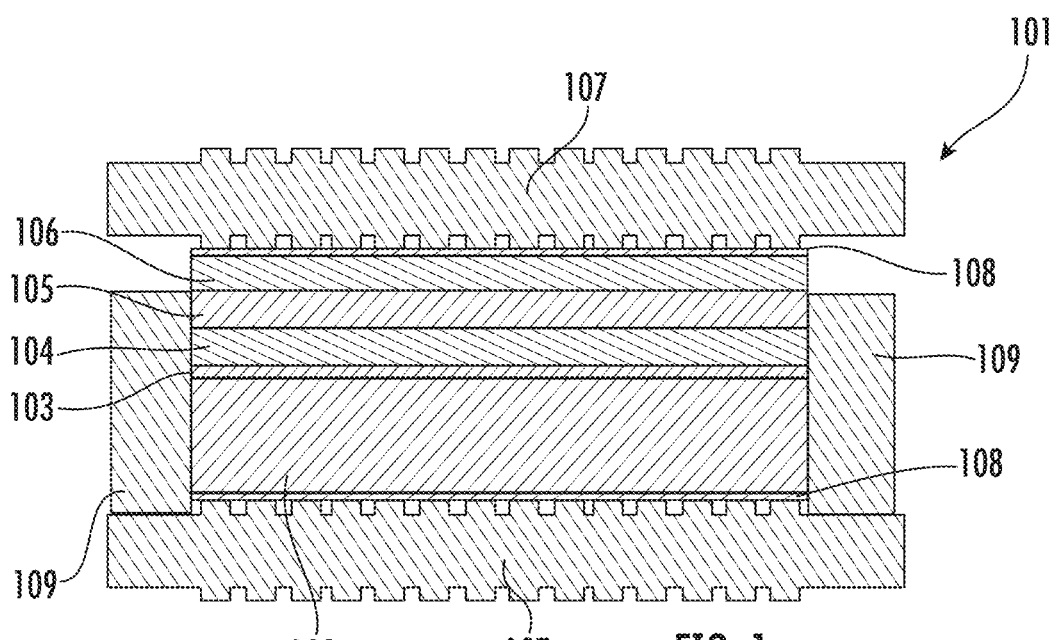
FIG. 1 is a schematic cross section of a single repetitive element of a fuel stack of the known type.
Figure 2:
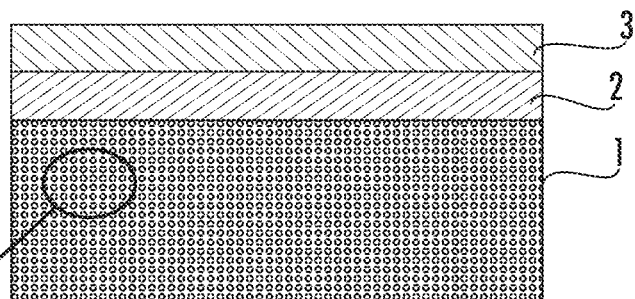
FIG. 2 is a schematic section view of a fuel cell supported by metal.

With reference to the attached FIG. 2, reference numeral 1 wholly indicates a metallic support of a fuel cell.

In particular, the support 1 represented in FIG. 2 is associated with a first layer of ceramic material that constitutes the anode 2 of the fuel cell to be produced, and with a second layer that constitutes the electrolyte 3 of the same cell.

This structure is usually defined as "half-cell", because it consists of an electrolyte and just one electrode.

The anode 2 consists, for example, of a mixture of nickel oxide and yttria-stabilized zirconia, or it can be made with another suitable material.

The electrolyte 3 can for example be made from yttria-stabilized zirconia, or from another suitable material.

The layers of ceramic material 2, 3 applied onto the support 1 can in any case be of another type, or having different functions within the fuel cell.

For example, instead of the anode 2, the cathode can be applied on the surface of the metallic support 1.

Figure 3:
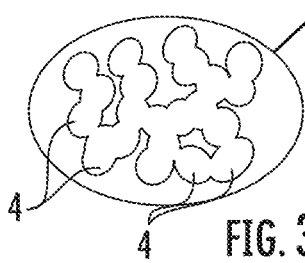
FIG. 3 is a detail of FIG. 2.

As schematically illustrated in the detail of FIG. 3, the metallic support 1 is of the porous type, i.e. it is preferably, but not exclusively, made by sintering of raw material in powder form.

For example, the metallic support 1 is made from ferritic steel containing chrome in a certain percentage, for example 22%.

The choice of this material is not however limiting for the purposes of the present invention.

The coupling between the metallic support 1 and the layers of material constituting the anode 2—or the cathode—and the electrolyte 3 can be carried out through one of the known technologies suitable for obtaining this result.

Preferably, but not exclusively, the metallic support 1 and the layers of material that constitute the anode and the electrolyte 2, 3 are co-sintered at high temperature in a single production stage.

However, it is possible to use all of the other known technologies described in the preamble of the present description.

Figure 4:
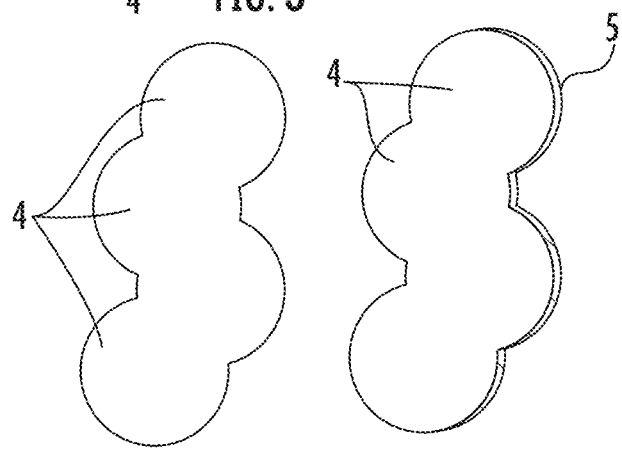
FIG. 4 is a schematic representation of single grains of metallic powder sintered to form a porous metallic support of a fuel cell.

In FIG. 4, for the sake of greater clarity, the single sintered grains 4 of the metallic support 1 are represented enlarged.

According to a version of the present invention, the deposition method comprises a step of preparing the surface of the metallic support 1, already joined to the anode 2 and to the electrolyte 3.

In particular, such a preparation step can consist of washing the metallic support 1 with solvents, acids or other products suitable for eliminating all of the impurities from the entire surface of the metallic support 1.

The method also comprises a step of providing an apparatus for an electrolytic bath.

Such a step also foresees the provision of the actuation means of the electrolytic bath itself.

In greater detail, this step foresees the provision, moreover, of a waveform generator suitable for this type of application, of the electrical power supply and of the anode to be inserted in the bath.

Within this step of providing the electrolytic bath, it is foreseen to prepare a suitable aqueous solution containing the cations necessary to obtain at least one ceramic material 5, as better described hereafter.

Then follows a step of dipping the metallic support 1 into the electrolytic bath thus provided.

Following the dipping, it is foreseen for there to be a step of controlling the aforementioned actuation means of the electrolytic bath so as to selectively carry out the electrochemical deposition of at least one layer of material 5 onto the metallic support 1.

In particular, after dipping the metallic support 1 in the electrolytic bath, a current is applied between the anode and the cathode of the bath itself.

In the case in which the material 5 is a ceramic material, such a passing of current causes the deposition, in a selective manner, of the ceramic phase on the surface of the metallic support 1, until the desired layer is made.

During the actuation of the electrolytic bath, in relation to specific requirements, it is possible to carry out an operative step of periodically modifying the concentration of the cations in the electrolytic bath.

In particular, this step can be carried out in the case in which it is necessary to carry out the co-deposition of different elements.

In this case, the mentioned step of providing the electrolytic bath foresees the preparation of a solution containing the various elements that are wished to be deposited.

Some of these elements inserted in the bath, indeed, are characterised by a speed of consumption—governed, for example, by Faraday's law—that is greater than others also present, and therefore they are deposited preferentially.

Thus by varying the concentration of certain cations inside the bath, i.e. by adjusting the restoration cycle of the elements that are consumed most rapidly, it is possible to obtain layers of ceramic material of different composition and/or mixtures of many different ceramic materials.

Figure 5:
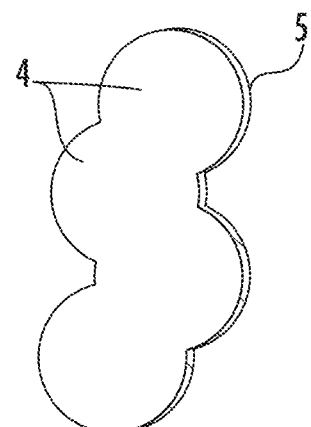
FIG. 5 is a schematic representation of the single grains of metallic powder of FIG. 4 on which a layer of anti-corrosion protective material has been deposited, through the method according to the present invention.

FIG. 5 schematically illustrates the result that can be obtained with the described method.

Indeed, the method makes it possible to deposit the layer of material 5 onto the surface of the single grains 4 of the metallic support 1, therefore also onto the surfaces of the grains that are enclosed in the pores themselves.

It is important to emphasise that the material is deposited only on the surface of the grains and does not fill the pores.

In this version of the invention, the layer of material 5 consists of an anti-corrosion protective ceramic layer.

For example, said layer of ceramic material 5 can comprise cerium oxide and/or other compounds of similar properties of anti-corrosion, of electrical conductivity and barrier against interdiffusion. There are several technical advantages given by this result.

The protective material phase, as stated, instead of being arranged as a single and homogeneous layer i.e. as a structure of conventional protective material—develops at the conductive phase—i.e. the metal—of which it closely follows the porous structure.

Figure 10:
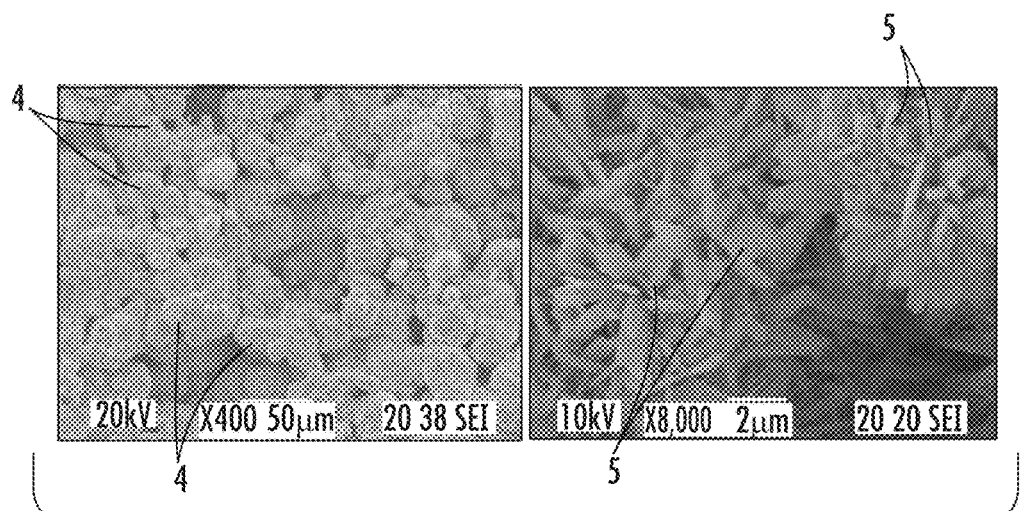
FIG. 10 is a microscope photograph of a sintered porous metallic support before and after the deposition of a layer of protective material.

This can clearly be seen in FIG. 10, which illustrates, on the left, a microscope photograph of the metallic support 1 before deposition, and on the right, the same support 1 coated with cerium oxide crystals.

This makes it possible to use small amounts of protective material with respect to other deposition technologies.

Another important advantage consists of the fact that, thanks to this result, it is no longer necessary to apply the layer that acts as a barrier against the interdiffusion of the elements usually present in known cells.

Indeed, the layer of material 5—for example in the case of ceramic material, cerium oxide or a mixture of cerium oxide and metallic oxide—as well as effectively protecting the metal from corrosion, itself constitutes an effective barrier to the interdiffusion of elements between metal and electrode.

This layer, according to its composition, as well as not hindering the conducting of current, can also perform the function of electrode material.

Cerium oxide can, indeed, replace—with better performance—the yttria-stabilized zirconia normally contained in the anode mixture.

Thanks to this, once the cerium oxide has been deposited, it could be sufficient to deposit just the nickel to complete the composition of the anode.

It should also be noted that in a conventional electrode, only a part of the material actually has a catalytic function, whereas all the rest is only used to transport the current from the interface with the electrolyte up to the current collector.

Therefore, the electrochemical deposition, by applying the phase directly onto the metal, reduces this distance and therefore the need for material to the minimum.

In conventional cells it is important to ensure that the electrode has a suitable porosity, to allow the diffusion of the gases.

A high porosity, however, often leads to poor mechanical properties.

In the application of the method according to the present invention, however, the porosity is dictated by the metallic support 1, and does not substantially change after electrodeposition.

Thanks to the method according to the invention, it is possible to deposit elements that normally are not chemically stable at high temperatures; for example, cerium oxide cannot be co-sintered together with zirconia since at high temperatures they would form a solid solution.

At the end of the electrochemical deposition step of the desired layer of material 5, the method foresees a step of washing the metallic support 1 to eliminate residues of the aqueous solution, and therefore cationic species that are still soluble.

Thereafter, in some embodiments, the method can comprise a step of carrying out a heat treatment of the metallic support 1 to promote the consolidation of the layer of ceramic material 5.

However, it should be emphasised that this step is entirely optional.

At the end of these steps, it is possible to proceed to the completion of the cell by depositing the cathode with one of the known technologies.

In another version of the invention, schematically represented in FIGS. 6, 7, 8 and 9, the metallic support 1 is associated just with a first layer of ceramic material that constitutes the electrolyte 3 of the fuel cell.

Therefore, the ceramic layer that constitutes the anode is not present.

In this version of the invention, a layer of anti-corrosion protective material 5 is deposited on the porous metallic support 1, as described for the previous version of the invention—for example in the case of ceramic material, cerium oxide or a mixture of cerium oxide and metallic oxide.

Figure 6:
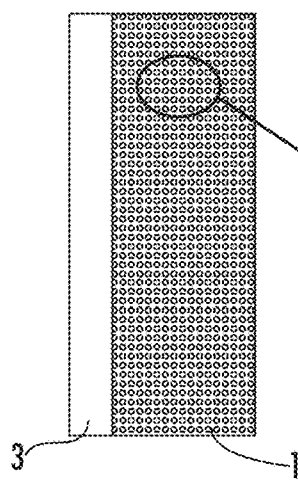
FIG. 6 is a schematic section view of a metallic support of a fuel cell, according to the version of FIG. 9.
Figure 7:
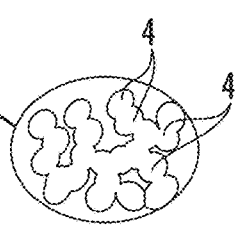
FIG. 7 is a detail of FIG. 6.
Figure 8:
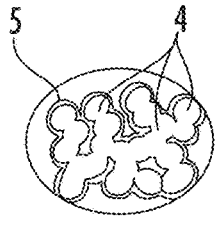
FIG. 8 is a detail of FIG. 6, in which the single grains of the metallic support are coated with a layer of anti-corrosion protective material.

This is schematically represented in FIGS. 6, 7 and 8, in a completely analogous way to the previous version of the invention.

Subsequently, again applying the method according to the invention, a further layer, which constitutes an electrode of the cell, preferably the anode 2, is deposited onto the layer of protective ceramic material 5.

Such a further layer can be made, for example, in a mixture of nickel and cerium oxide, and thus possesses catalytic properties.

Figure 9:
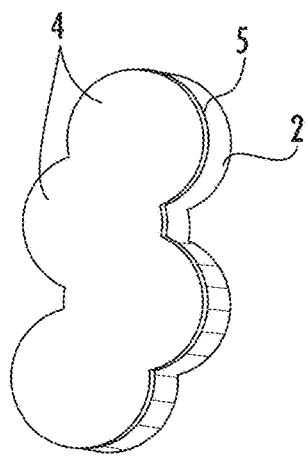
FIG. 9 is a schematic representation of single grains of metallic powder sintered to form a porous metallic support of a fuel cell, according to the version of FIGS. 6, 7 and 8, in which a further layer of material constituting an electrode has been applied onto the layer of anti-corrosion protective material.

The result that can be obtained is schematically illustrated in FIG. 9.

The anode 2 deposits following the porosity of the metallic support 1, so as to use a minimum amount of material.

The method according to the present invention thus makes it possible to complete the cell starting from a bilayer semi-worked product comprising the porous metallic support 1 and the electrolyte 3 deposited on it, for example with conventional technologies or with vacuum techniques (e.g. PVD, CVD).

Figure 11:
FIG. 11 is a schematic side view of a metallic support of complex geometry consisting of an interconnector of a fuel cell.
Figure 12:
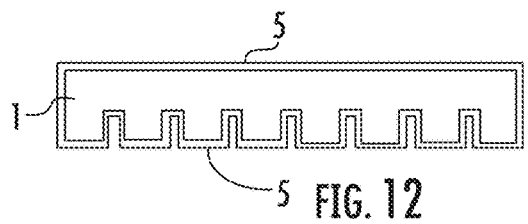
FIG. 12 is a schematic side view of the interconnector of FIG. 11 provided with a layer of anti-corrosion protective material.

In another version of the invention, schematically illustrated in FIGS. 11 and 12, the method is applied to deposit a protective coating, consisting of a layer of ceramic material 5, onto a dense metallic support 1 having complex geometry. By dense metallic support having complex geometry we mean a support that includes, for example, a pre-perforated surface, or a three-dimensional structure with channels, or similar.

For example, in this case the metallic support 1 can consist of one of the metallic interconnectors that separate the single cells inside a fuel stack. The deposition of a protective coating on metallic supports 1 of this type, especially when their geometry is complex, would be particularly complicated, long and laborious through the common deposition techniques of ceramic films.

In this version of the invention, for example the aforementioned layer of ceramic material 5 comprises cobalt and/or manganese.

It should be specified that another object of the present invention is also a metallic support 1 coated with a layer of material 5 deposited by applying the method according to one of the versions of the invention described earlier.

It has thus been seen how the invention achieves the proposed purposes.

The method according to the invention, thanks to the characteristics of electrodeposition technology, makes it possible to selectively deposit a layer of anti-corrosion protective ceramic material on the metallic support of the fuel cell in an efficient and cost-effective manner even on a support on which one of the electrodes and the electrolyte have already been provided, for example through co-sintering.

As stated, the deposition is selective in the way that it mainly occurs on the surface of the metallic support.

The problems relating to the corrosion of all of the metallic parts support, interconnectors present in a cell or in a stack of cells are thus effectively eliminated, even if they are characterised by complex geometry.

It should be specified that the present invention can be applied both in the field of fuel cells and in that of electrolysis cells: therefore, whenever in the present description reference has been made, as an example, to application to a fuel cell, it should be understood that the same concepts can be applied to electrolysis cells without any limitation.

The present invention has been described according to preferred embodiments, but equivalent variants can be devised without departing from the scope of protection offered by the following claims. In the case in which the technical characteristics mentioned in the claims are followed by reference numerals, such reference numerals are introduced with the sole purpose of increasing the clarity of the claims and consequently the aforementioned reference numerals have no limiting effect on the interpretation of each element identified as an example by such reference numerals.

The invention claimed is:

1. A metallic support for solid oxide fuel cells comprising an electrolyte, said metallic support comprising a porous metallic material comprising single sintered grains, at least one additional layer of ceramic material, that constitutes the electrolyte of a fuel cell, coupled to the porous metallic material, and at least one layer of material, arranged on the surface of said porous metallic material, comprising a ceramic material with anti-corrosion properties, wherein said layer of ceramic material is deposited onto the surface of the single grains of the porous metallic material, and wherein said layer of ceramic material with anti-corrosion properties comprises cerium oxide or a mixture of cerium oxide and metallic oxide, which constitutes an effective barrier to the interdiffusion of elements between said porous metallic material and said electrolyte, said metallic support comprising a further layer, made in a mixture of nickel and cerium oxide, which constitutes an anode of the fuel cell, deposited onto said layer of ceramic material with anti-corrosion properties, wherein said anode is deposited following the porosity of said porous metallic material.

2. The metallic support according to claim 1, wherein said layer of ceramic material comprises nickel and/or cerium oxide and/or cobalt and/or manganese.

3. A method for depositing at least one layer of material on a metallic support for solid oxide fuel cells comprising an electrolyte, wherein said metallic support comprises a porous metallic material comprising single sintered grains, comprising the steps of:

preparing a surface of the metallic support, said metallic support comprising the porous metallic material comprising the single sintered grains;

preparing an apparatus for an electrolytic bath comprising an anode and a cathode, with relative actuation means of the apparatus, containing an aqueous solution with cations necessary to obtain a layer of ceramic material;

dipping the metallic support in said electrolytic bath;

controlling said actuation means of the electrolytic bath so as to apply a current between the anode and the cathode of said bath, said current causing the deposition, in a selective manner, of the ceramic material on the surface of the metallic support, until said layer of ceramic material is made, wherein said layer of ceramic material comprises a ceramic material with anti-corrosion protection properties, and wherein said layer of ceramic material is deposited onto the surface of the single grains of the metallic support, wherein said layer of ceramic material comprises cerium oxide or a mixture of cerium oxide and metallic oxide, which constitutes an effective barrier to the interdiffusion of elements between said metallic support and said electrolyte; and depositing, by means of the apparatus for electrolytic bath, a further layer, made in a mixture of nickel and cerium oxide, which constitutes an anode of the fuel cell, onto said layer of ceramic material, wherein said anode is deposited following the porosity of said metallic support.

4. The method according to claim 3, comprising a step of washing the metallic support, after the deposition of the layer of material, to eliminate residues of the aqueous solution.

5. The method according to claim 3, comprising a step of carrying out a heat treatment of said metallic support to promote consolidation of the layer of material on said metallic support.

6. The method according to claim 3, wherein said layer of ceramic material comprises nickel and cerium oxide.

7. The method according to claim 3, further comprising a step of periodically modifying the concentration of the cations in said electrolytic bath.

8. The method of claim 7, wherein the step of periodically modifying the concentration of the cations in said electrolytic bath comprises adjusting a restoration cycle of elements that are most rapidly consumed.

9. The method of claim 7, wherein the step of periodically modifying the concentration of the cations in said electrolytic bath enables providing different layers of material of different composition on the metallic support.

* * * * *